S. L. BARTLETT.
VACUUM STEAM TRAP.
APPLICATION FILED MAR. 19, 1910.
1,011,103.
Patented Dec. 5, 1911.
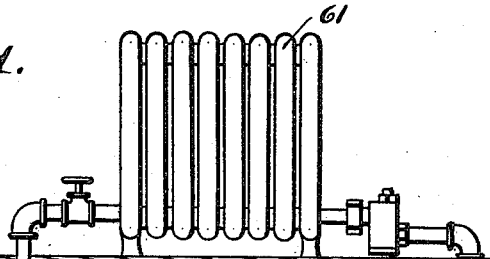
Fig. 1.
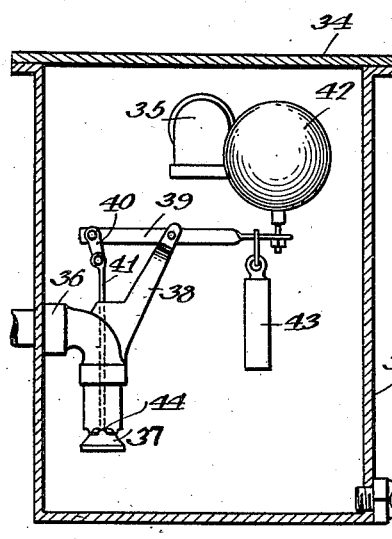
Fig. 2.
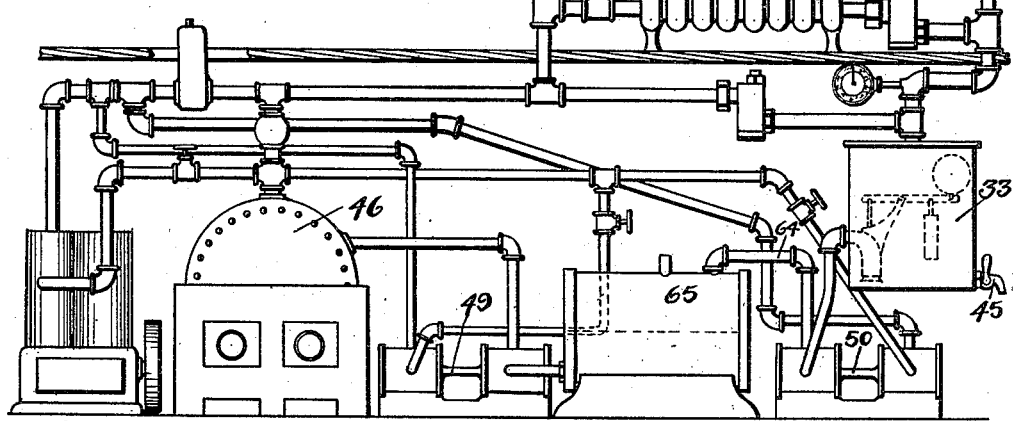
Witnesses
F. C. Caswell
W. A. Loftus.
Inventor
Samuel Lewis Bartlett
by Sherman P. Lamberton Atty

UNITED STATES PATENT OFFICE.

SAMUEL LEWIS BARTLETT, OF ST. PAUL, MINNESOTA.

VACUUM STEAM-TRAP.

1,011,103.          Specification of Letters Patent.        Patented Dec. 5, 1911.

Application filed March 19, 1910. Serial No. 550,406.

*To all whom it may concern:*

Be it known that I, SAMUEL LEWIS BARTLETT, a citizen of the United States, residing at St. Paul, in the county of Ramsey and State of Minnesota, have invented a certain new and useful Vacuum Steam-Trap, of which the following is a specification.

The object of my invention is to provide for vacuum heating systems a novel, simple and durable steam trap designed to control the operation of vacuum pumps employed in such systems.

A further object is to provide in a heating system a trap adapted to prevent the passage of steam from the system to the vacuum pump.

A further object is to provide a trap of this type arranged to catch the sediment formed in a connected system and adapted to be cleaned out by steam while the system is in operation.

In the drawings Figure 1 shows a vacuum heating system with my improved vacuum steam trap attached, and Fig. 2 is a detail sectional view of said trap.

Referring to the accompanying drawings, I have illustrated a steam heating system, comprising a steam boiler 46, an inlet pipe 53, radiators 61, return pipe 63, pumps 49 and 50 and the tank 65.

My improved vacuum steam trap is constructed and arranged in the heating system as fololws: The body portion 33 is fitted with an air tight cover 34. The inlet pipe 35 is connected to the return pipe 63 of the system and the exhaust pipe 36 communicates with the vacuum pump 50. The exhaust pipe 36 extends inward and downward within the body portion 33 and forms at its lower end a seat for the valve 37. Pivoted to the support 38 on the exhaust pipe 36 is a lever 39, which is connected by a link 40, at one end, to the valve stem 41, and to an upward extended float 42 at the other end. The weight 43 is suspended from the last mentioned end of said lever 39 to normally seat the valve 37 in the exhaust pipe 36. The base of this pipe is provided with grooves 44 to form a construction whereby the open end of said pipe is restricted without being wholly closed, when the valve 37 is seated. A pet-cock 45 is arranged in the bottom portion of the trap 33, and is opened to permit the exhaust of steam from said trap for cleaning the same.

In use, the water of condensation formed in the system drains into the trap 33. The accumulation of water within the system reduces the vacuum therein, and the pump 50 which operates when the vacuum falls below a predetermined point, begins to pump the water from the trap 33. The action of the pump at this time is slow, however, on account of the resistance met in drawing the water through the grooves 44 in the pipe 36. The water within the trap rises and lifts the float 42, thus opening the valve 37. The opening of the valve allows the pump 50 to pump its maximum amount until the water level in the trap falls to a point permitting the closing of said valve by the weight 43. The pump 50 is then forced to operate slowly until the water level in the trap 33 falls below the base of the exhaust pipe 36, when both air and water are pumped from the trap through the grooves 44, and the operation of the pump is stopped by the vacuum within the system. When the water again rises in the trap 33 the operation is repeated. The trap 33 is blown out by steam from the boiler 46 when the pet-cock 45 is opened.

What I claim as new, and desire to protect by Letters Patent, is:

1. A vacuum trap for regulating the operation of vacuum air pumps, comprising an air-tight receptacle provided with an inlet pipe and a discharge pipe, said discharge pipe having a downwardly extending portion within the receptacle, a valve in said receptacle arranged to rest normally against the lower open end of said discharge pipe for restricting said open end without wholly closing the same, a float in said receptacle, and a positive connection between said valve and said float for moving said valve downwardly away from the open end of said discharge pipe to fully open said end upon the rise of water in the receptacle.

2. A vacuum trap for regulating the operation of vacuum air pumps, comprising an air-tight receptacle, an inlet pipe near the top of said receptacle, a discharge pipe having a downwardly extending portion terminating near the bottom of said receptacle, a valve normally seated against the lower open end of said discharge pipe to restrict the opening of said discharge pipe without wholly closing the same, a pivotally mounted lever connected at one end with said valve, means for normally holding said lever in a position to force the valve upwardly against its seat, and a float connected to the other end of said lever for moving said valve downwardly away from the open end of said discharge pipe to fully open said end upon the rise of water in said receptacle.

3. A vacuum trap for regulating the operation of vacuum air pumps, comprising an air-tight receptacle, an inlet pipe communicating with said receptacle near the top thereof, a discharge pipe extending downwardly in said receptacle to a point near the bottom thereof and provided with notches at its open end, a valve at the open end of said discharge pipe, said notches preventing the valve from wholly closing the open end of said discharge pipe, a lever pivotally mounted on said pipe, a float on one end of said lever to operate the same on the rise of water in the receptacle, a valve stem pivotally connecting the other end of said lever with said valve to cause said valve to move downwardly away from the end of said discharge pipe, and a weight for normally holding the valve upwardly against the open end of said discharge pipe.

November 19, 1909.

SAMUEL LEWIS BARTLETT.

Witnesses:
JOHN R. WILBOR,
OLIVE A. WILBOR.

Copies of this patent may be obtained for five cents each, by addressing the "Commissioner of Patents, Washington, D. C."